(12) United States Patent
Kirschner et al.

(10) Patent No.: US 11,836,988 B2
(45) Date of Patent: Dec. 5, 2023

(54) METHOD AND APPARATUS FOR RECOGNIZING AN OBJECT FROM INPUT DATA

(71) Applicant: Robert Bosch GmbH, Stuttgart (DE)

(72) Inventors: Matthias Kirschner, Hildesheim (DE); Thomas Wenzel, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 215 days.

(21) Appl. No.: 17/394,872

(22) Filed: Aug. 5, 2021

(65) Prior Publication Data

US 2022/0044035 A1 Feb. 10, 2022

(30) Foreign Application Priority Data

Aug. 6, 2020 (DE) .................. 10 2020 209 979.0

(51) Int. Cl.
 *G06V 20/58* (2022.01)
 *G06T 7/70* (2017.01)
 *B60W 30/09* (2012.01)
 *B60W 30/06* (2006.01)

(52) U.S. Cl.
 CPC .............. *G06V 20/58* (2022.01); *B60W 30/06* (2013.01); *B60W 30/09* (2013.01); *G06T 7/70* (2017.01); *B60W 2420/42* (2013.01); *G06T 2207/20084* (2013.01)

(58) Field of Classification Search
 CPC ...... G06V 20/58; G06V 10/454; G06V 10/82; G06V 40/10; B60W 30/06; B60W 30/09; B60W 2420/42; G06T 7/70; G06T 2207/20084; G06F 18/25; G06N 3/045; G06N 3/061; G06N 3/08
 See application file for complete search history.

(56) References Cited

U.S. PATENT DOCUMENTS

| | | | |
|---|---|---|---|
| 11,200,679 B1* | 12/2021 | Li | G06T 7/77 |
| 11,348,269 B1* | 5/2022 | Ebrahimi Afrouzi | G01S 17/48 |
| 11,500,099 B2* | 11/2022 | Liang | G06N 3/02 |
| 2019/0354782 A1* | 11/2019 | Kee | G06V 10/763 |
| 2019/0383631 A1* | 12/2019 | Bigio | G06V 20/59 |

(Continued)

OTHER PUBLICATIONS

Gilles Burel & Dominique Carel, Detection and localization of faces on digital images, Pattern Recognition Letters, Oct. 1994, pp. 963-967, vol. 15, Issue 10.

*Primary Examiner* — Md K Talukder
(74) *Attorney, Agent, or Firm* — Maginot, Moore & Beck LLP (57) ABSTRACT

A method for recognizing an object from input data is disclosed. Raw detections are carried out in which at least one attribute in the form of a detection quality is determined for each raw detection. At least one further attribute for each raw detection is determined. A temporally or spatially resolved distance measure is determined for at least one attribute of the raw detections. Raw detections of a defined distance measure are combined to form a group of raw detections. The object is recognized from a group with at least one raw detection with the smallest distance measure of the at least one attribute in comparison with another raw detection, or from a group with at least one raw detection which were combined by combining at least two raw detections with the smallest distance measure of the at least one attribute to form said one raw detection.

16 Claims, 5 Drawing Sheets

(56) References Cited

U.S. PATENT DOCUMENTS

| | | | |
|---|---|---|---|
| 2020/0293796 A1* | 9/2020 | Sajjadi Mohammadabadi | G06V 10/751 |
| 2020/0307563 A1* | 10/2020 | Ghafarianzadeh | G06V 40/25 |
| 2021/0156960 A1* | 5/2021 | Popov | G06V 10/82 |
| 2021/0156963 A1* | 5/2021 | Popov | G06N 3/045 |
| 2022/0044035 A1* | 2/2022 | Kirschner | B60W 30/09 |

* cited by examiner

METHOD AND APPARATUS FOR RECOGNIZING AN OBJECT FROM INPUT DATA

This application claims priority under 35 U.S.C. § 119 to application no. DE 10 2020 209 979.0, filed on Aug. 6, 2020 in Germany, the disclosure of which is incorporated herein by reference in its entirety.

TECHNICAL FIELD

The disclosure relates to a method for recognizing an object from input data. The disclosure furthermore relates to an apparatus for recognizing an object from input data. The disclosure furthermore relates to a computer program and a machine-readable storage medium.

BACKGROUND

Object detection is an application known per se of machine-learned systems, e.g. of trained neural networks. Algorithms for object detection yield a set of detections for an input datum (e.g. an image), a detection generally being represented by a bounding element (referred to as bounding box) enclosing the object and by a scalar detection quality. In general, these algorithms do not just yield a single detection for an object, but rather a plurality of slightly shifted and/or scaled bounding elements in the surrounding area of the object. These detections of an object are also referred to hereinafter as raw detections of the object. A raw detection thus comprises a detected object and an attribute that at least partly identifies said object. In the prior art, such an attribute is a bounding element or a bounding box that at least partly surrounds the detected object. In order to select the best raw detection from the raw detections and to obtain only one detection per object, a process of so-called non-maximum suppression (NMS) is carried out downstream. What has gained acceptance here as a de facto standard is so-called greedy NMS, as is known for example from Burel Gilles and Dominique Carel: "Detection and localization of faces on digital images", Pattern Recognition Letters 15.10 (1994): 963-967.

In that case, the raw detections are discarded if they overlap in a certain percentage with another detection with higher quality.

A free parameter of non-maximum suppression is the overlap threshold value, exceedance of which allows a detection with higher quality to suppress a detection with lower quality. With a threshold value that is too low, "double detections" increasingly occur, that is to say that even after non-maximum suppression a plurality of detections are obtained for a single object. Conversely, a threshold value that is too high can cause detections that are actually correct to be suppressed if a plurality of objects appear in neighboring image regions, for example in the case of a group of persons. Owing to its importance there is a great variety of NMS methods, although to date none of them has been able to become generally accepted owing to the disproportionately high calculation complexity.

SUMMARY

It is an object of the disclosure to provide a method for recognizing objects from input data in an improved way.

In accordance with a first aspect, the object is achieved by a method for recognizing an object from input data, comprising the following steps:

a) carrying out raw detections, wherein at least one attribute in the form of a detection quality is determined for each raw detection;
b) determining at least one further attribute for each raw detection;
c) determining a temporally or spatially resolved distance measure for at least one attribute of the raw detections, and subsequent grouping of the raw detections using the distance measure results; and
d) determining the object to be recognized from a group with at least one raw detection with the smallest distance measure of the at least one attribute in comparison with another raw detection or determining the object to be recognized from a group with at least one raw detection which were combined by combining at least two raw detections with the smallest distance measure of the at least one attribute to form said one raw detection.

This advantageously provides a modification of non-maximum suppression which, in the case of an object detection, enables an improved resolution of ambiguous object constellations. For this purpose, further information in the form of an attribute of a predicted object is processed in the non-maximum suppression. As a result, raw detections attributed in an improved manner are thereby used for the object detection. By way of example, the proposed method can be used in the context of inference in a vehicle with a trained neural network.

In accordance with a second aspect, a method for controlling an autonomously driving vehicle taking account of environment sensor data is provided, wherein the method comprises the following steps:

capturing environment sensor data by way of at least one environment sensor of the vehicle;

recognizing an object on the basis of the captured environment sensor data in the form of input data in accordance with the method according to the disclosure; and determining, taking account of the recognized object, a surroundings state of the vehicle by means of a control module of the vehicle, wherein at least one traffic situation of the vehicle including the recognized object is described in the surroundings state;

generating a maneuvering decision by means of the control module of the vehicle control, wherein the maneuvering decision is based on the surroundings state determined;

effecting, by means of control systems of the vehicle control, a control maneuver on the basis of the maneuvering decision.

It is thereby possible to provide an improved method for controlling an autonomously driving vehicle which comprises an improved object recognition.

In accordance with a third aspect, the object is achieved by an object detection apparatus configured to carry out the method.

In accordance with a fourth aspect, the object is achieved by a computer program comprising instructions which, when the computer program is executed by a computer, cause the latter to carry out a method for detecting an object from input data.

The embodiments relate to preferred developments of the method.

One advantageous development of the proposed method provides for the temporally and/or spatially resolved distance measure to be determined for at least one of the following attributes: direction of movement of an object, orientation of an object, distance of an object from a sensor device, interaction of an object with at least one other object, Euclidean distance of parts of an object. In this way, the distance measure is advantageously determined for different attributes.

A further advantageous development of the method provides for wherein a first threshold value of a first distance measure and a second threshold value of a further distance measure to be used for suppressing a raw detection in step d). Defined boundary conditions for suppressing raw detections are defined in this way.

A further advantageous development of the method provides for at least one further attribute determined for input data of one sensor device to be used for input data of another sensor device. In this way, it is advantageously possible to use attributes for different input data.

A further advantageous development of the method provides for an attribute for determining an object from the raw detections to be embodied as a bounding element. A kind of localization of an object in a reference system is provided in this way. Within the meaning of the application, a bounding element is a bounding box used to delimit an object to be recognized in an image recording.

A further advantageous development of the method provides for an attribute for determining an object from the raw detections to be embodied as principal points of the object. An alternative kind of localization of an object in a reference system is provided in this way. Principal points of the object may be given by individual constituent parts. For the example of a detected person, principal points may be given by individual body parts of the person.

A further advantageous development of the method provides for determining the attributes to be carried out by an object detection apparatus and/or by an algorithm. Different possibilities for determining the additional attributes are advantageously provided as a result.

Further advantageous development of the method provide for the input data to be provided by one sensor device or by a plurality of sensor devices or by a storage medium. As a result, the input data can advantageously be provided by different sensor devices, wherein in the case of a plurality of sensor devices the latter are calibrated among one another.

A further advantageous development of the method provides for the input data to comprise at least one from the following: camera data, radar data, lidar data, ultrasonic data. As a result, different sensor devices can advantageously be used for providing the input data.

A further advantageous development of the method provides for wherein a control signal for a physical system, in particular a vehicle, to be generated depending on the recognized object. A control signal for a vehicle that is dependent on the object recognition can advantageously be generated in this way.

According to one embodiment, the control maneuver is an evasive maneuver and/or an overtaking maneuver, wherein the evasive maneuver and/or the overtaking maneuver are/is suitable for steering the vehicle past the recognized object.

A further improvement of the vehicle control is achieved as a result.

The disclosure is described in detail below with further features and advantages with reference to several figures. In this case, identical or functionally identical elements have identical reference signs.

Disclosed method features are evident analogously from corresponding disclosed apparatus features, and vice versa. This means, in particular, that features, technical advantages and explanations concerning the proposed method are evident analogously from corresponding explanations, features and advantages concerning the object detection apparatus, and vice versa.

DETAILED DESCRIPTION

A central concept of the present disclosure is, in particular, an extension of existing NMS methods.

It is proposed to extend an overlap criterion and/or a decision criterion with respect to the suppression function of non-maximum suppression by additional semantic information or attributes in order that the disadvantageous ambiguities described above are avoided to the greatest possible extent. This information is provided to a suppression device with an NMS functionality, wherein each raw detection is provided with one or more additional attributes having a distance function. By way of the additional attributes assigned to each object or to each raw detection, an additional differentiation criterion can be provided, on the basis of which a differentiation of different detected objects or different raw detections can be achieved.

Within the meaning of the application, raw detections are manifested from a detected object and at least one attribute enabling the detected object to be identified. Said attribute can be a bounding element in the form of a bounding box that at least partly encompasses the detected object. Alternatively, the attribute can be a principal point of the object that is detected and recognized by the detection apparatus. In the case of a person as detected object, a principal point may be given by a body part of the person. If the object of the raw detection is identified by principal points, the respective attribute can comprise a plurality of principal points.

In this context, additional attributes can be a direction of movement of a detected object, an orientation of a detected object, a distance of a detected object from a sensor device, an interaction of a detected object with at least one other detected object or, for example, a Euclidean distance of parts of an object.

By applying a distance measure between additional attributes of a plurality of detected objects, the objects for which the distance measure is greater than a predetermined limit value can be identified as different and objects for which the distance measure is less than a predetermined limit value can be identified as identical. As a result, a more precise object detection can be achieved by virtue of the fact that, by way of the distance measure, it is possible to determine whether for example a bounding box of a raw detection contains only one object or a plurality of at least partly concealed objects.

This information regarding the number of objects encompassed by a bounding box can be used in a subsequent NMS method as an additional decision criterion for the NMS method for selecting the most suitable bounding box.

Advantageously, a computational complexity is thereby increased only slightly compared with conventional NMS methods. Further examples of additional attributes are a depth (i.e. the distance of an object from a sensor device) or the orientation of an object. The additional attributes can be generated by the detection algorithm itself or by combination with another source of information (e.g. stereo algorithm for depth estimation).

A conventional suppression device receives as input a series of raw detections defined by an attribute in the form of a bounding element and a scalar detection quality. Within the meaning of the application, a bounding element is a bounding box surrounding a recognized object or object to be recognized. For each raw detection the geometric overlap with all other raw detections is calculated in the input datum. A customary overlap criterion here is the so-called "Intersection-over-Union" (IoU), representing a quotient between the intersection area content of two bounding elements and a union area content of the two bounding elements. In the case where this value is higher than a predefined threshold value, the raw detection with the lower detection quality is suppressed.

Various variants of such suppression devices are known, e.g. greedy non-maximum suppression, optimal non-maximum suppression or soft non-maximum suppression. These differ in the order of the comparisons of two bounding elements, bounding box, an order in which bounding elements are suppressed, and an exact overlap criterion. A commonality of all the variants mentioned is that they are based on a purely geometry-based similarity criterion, such as the aforementioned Intersection-over-Union.

In particular, they usually consist of the following steps carried out successively: grouping of bounding elements on the basis of a geometry-based distance criterion and subsequent group-internal suppression or resorting of bounding elements.

Figure 1:
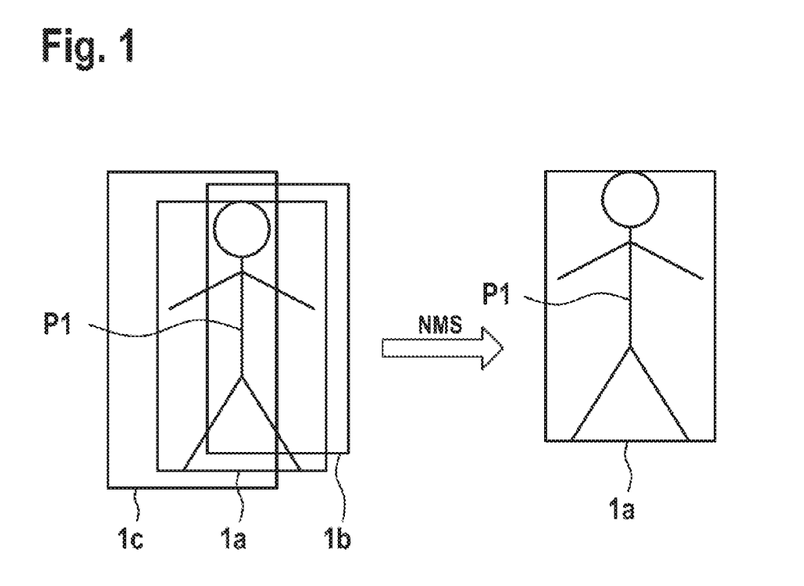
FIG. 1 shows a basic illustration of a conventional NMS method with one object.

FIG. 1 shows in principle a processing step in the form of non-maximum suppression NMS, effected downstream of a conventional object detection. The left-hand section illustrates raw detections of an object in the form of a person P1 with three attributes 1a, 1b, 1c in the form of bounding elements (bounding box) with different confidence values (confidence levels). For each raw detection provision is made for only a single bounding element to enclose or bound the object to be detected in the form of a person P1. In this case, a first attribute 1a in the form of the first bounding element can have a confidence value of 0.9, a second attribute 1b in the form of a second bounding element can have a confidence value of 0.8, and a third attribute 1c in the form of a third bounding element can have a confidence value of 0.7.

Then the person P1 is recognized by means of the raw detection with the attribute 1a, whereas the raw detections with the attributes 1b, 1c are suppressed since they have the lower confidence values. As a result, therefore, the raw detections with the attributes 1b, 1c are suppressed and only the result of the raw detection with the attribute 1a is output, which is indicated in the right-hand section of FIG. 1.

A weakness of conventional non-maximum suppression is that its decision is based exclusively on the coordinates of the bounding elements and on the confidence values of the raw detections (detection qualities). Theoretically, however, two different contents of the input data, for example an image with one person and an image with two persons standing one behind or next to the other, can lead to identical raw detections and thus to identical input data for the non-maximum suppression. This ambiguity can no longer be correctly resolved by the conventional non-maximum suppression NMS, under certain circumstances. Since the non-maximum suppression is carried out as a last step of an object detection and thus has a huge influence on the output of an object recognition system, errors in real applications can disadvantageously lead to malfunctions, e.g. of an autonomous vehicle equipped with such a system.

Figure 2:
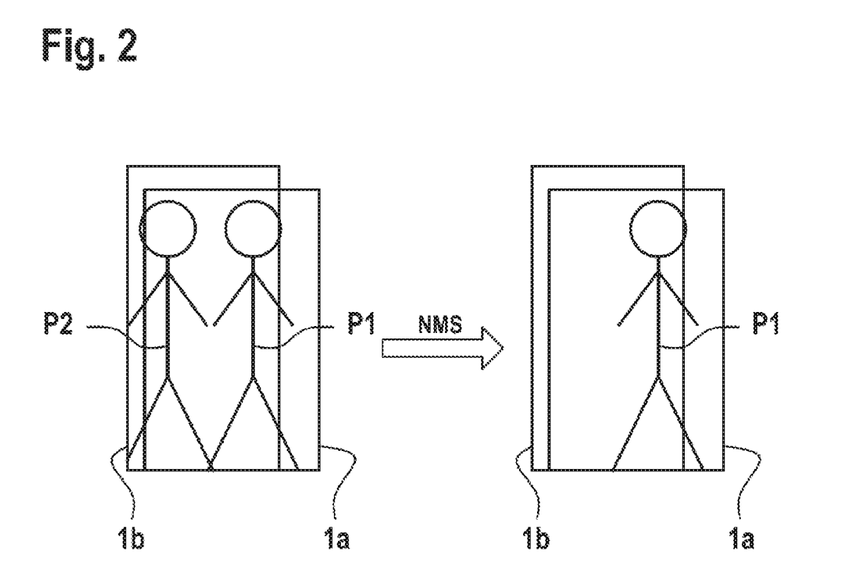
FIG. 2 shows a basic illustration of a conventional NMS method with two objects.

Such a problem is indicated in FIG. 2. In this case, two person P1, P2 are predicted or determined by means of raw detections with attributes 1a, 1b. This involves for example detecting the person P1 in the right-hand section of the attribute 1a in one raw detection, and the person P2 in the left-hand section of the attribute 1b in another raw detection. These patterns of the raw detections are ambiguous at a geometric level and therefore cannot be resolved or can be interpreted incorrectly by the conventional non-maximum suppression NMS. This is indicated in the right-hand section of FIG. 2, where it is evident that only the raw detection with the recognized person P1 with the attribute 1a is output.

What is proposed for improving the problem outlined is a method which determines at least one further attribute 1a . . . 1n for each raw detection, for which at least one further attribute a spatially and/or temporally resolved distance measure is determined from at least one other raw detection. The raw detections attributed in this way are transferred to non-maximum suppression carried out afterward.

Figure 3:
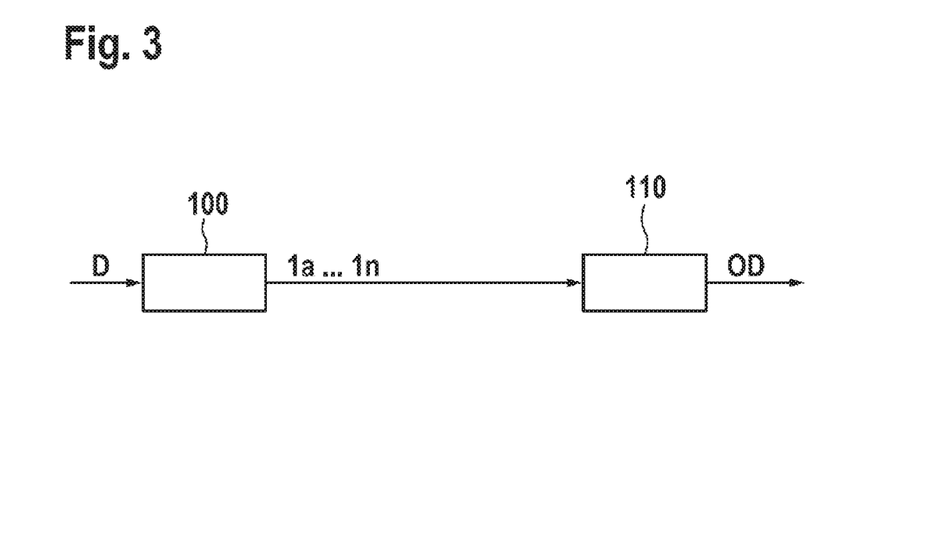
FIG. 3 shows a basic sequence of the proposed method.

In principle, the proposed method is indicated in FIG. 3, wherein an object detection apparatus 100 is evident, for example with a trained neural network (region proposal network, convolutional neural network), to which input data D in the form of environment sensor data (e.g. camera data, lidar data, radar data, ultrasonic data, etc.) are fed. In this case, the input data D are represented in an image-like form in a 2D grid or a 3D grid. The neural network is trained for an object recognition on the basis of image data. Training of the neural network for image recognition can be performed according to a training process known from the prior art. The neural used can be embodied as a convolutional neural network and comprise an arbitrary plurality of convolutional kernels.

Raw detections with assigned attributes 1a . . . 1n (e.g. bounding elements, confidence values, object classifications, etc.) are carried out by means of the object detection apparatus 100. In the case of the raw detections, it is proposed to determine at least one further attribute 1a . . . 1n, for which a spatially and/or temporally resolved distance measure is determined from at least two raw detections. These raw detections improved according to the disclosure are fed to non-maximum suppression NMS, which is carried out by means of a suppression device 110. As a result, filtered object detections OD with at least one recognized object are thereby provided at the output of the suppression device 110.

The proposed method thus extends the conventional non-maximum suppression NMS by a generalized grouping method, that is to say provides a more general distance measure between raw detections, which is calculated from all attributes 1a . . . 1n including the at least one additional attribute 1a . . . 1n from at least two raw detections. In this case, the similarity measure represents an inverse distance measure. The at least one further attribute 1a . . . 1n mentioned can be represented as a scalar value, for example in the form of a distance of the object from the object detection apparatus 100, or as a vector, in the form of an orientation of the detected object relative to the object detection apparatus 100, wherein the entries of the vector or the scalar value can be both of continuous nature and of categorical nature. A categorical attribute can e.g. define the fact that an object is hidden or not hidden. The categorical attribute "object hidden" can be represented here e.g. as the numerical value 0 and the categorical attribute "object not hidden" can be represented here as the numerical value 1.

The temporally and/or spatially resolved distance measure of the attribute can be determined for a direction of movement of an object, an orientation of an object, a distance of an object from a sensor device, an interaction of an object with at least one other object, Euclidean distances of parts of an object, e.g. distances between body parts of a human being, etc.

In this case, the attributes $1a \ldots 1n$ can be estimated by the object detection apparatus 100 itself, or can be calculated by combination of the raw detections with a further algorithm. The grouping is effected analogously to traditional non-maximum suppression, but with a more general distance measure.

Implementing the proposed method requires, besides the extension of non-maximum suppression by the generalized distance measure, a processing chain that provides the non-maximum suppression with general attributed raw detections. The conventional non-maximum suppression assumes that the raw detections are represented only by attributes $1a \ldots 1n$ in the form of a bounding element and a vector or scalar which encode the object class confidence.

By contrast, the proposed extension proposes either further attributes $1a \ldots 1n$ or alternative attributes $1a \ldots 1n$. In this regard, for instance, the attribute $1a \ldots 1n$ in the form of a bounding element can be replaced by so-called principal points, wherein each principal point encodes the position of an individual component of an object (e.g. head, right/left arm of a person, etc.).

The proposed method thus involves determining improved attributed raw detections and subsequently transferring them to non-maximum suppression. Two variants as to how such raw detections can be carried out are described by way of example below:

$1^{st}$ Variant: Prediction of the Attributes by the Object Detection Apparatus 100:

In this variant, which is indicated in FIG. 3, the additional at least one further attribute $1a \ldots 1n$ is predicted by the object detection apparatus 100. For this purpose, the detection algorithm of the object detection apparatus 100 is supplemented by an operation that calculates the at least one additional attribute $1a \ldots 1n$.

FIG. 3 shows an exemplary sequence of the proposed method on a processing device $20a \ldots 20n$ (not illustrated). The object detection apparatus 100 processes the input data D and yields as the result a set of raw detections with a set of attributes $1a \ldots 1n$. The downstream non-maximum suppression carried out by means of a suppression device 110 filters the attributed raw detections by discarding those raw detections for which there is another raw detection with higher confidence in their vicinity.

The object detection apparatus 100 can comprise a neural network trained for object recognition, the recognition of an object being made possible by means of said neural network. Furthermore, the neural network is trained to recognize the further attributes of the raw detection. For this purpose, the neural network can be trained in a corresponding training process by way of training data, in particular training image recordings, being provided with corresponding attributes, such that the trained neural network is able to recognize the attributes.

In order to carry out the training process, objects of the training data or of the image recordings used for training can be annotated with additional attributes, such that the neural network can be trained to recognize the additional attributes. In image recordings of the training data sets, the objects represented there can thus be identified by various attributes such as, for example, by orientations or directions of movement. A complete object annotation thus describes an individual object that appears in the scene of the image recording by using a set of attributes, such as, for example, the bounding box, an object class, or the distance of the object from the camera. All attributes required in the NMS can accordingly be stored in the annotations. These annotations of the attributes and also of the additional attributes can be performed manually during a supervised training process. Alternatively, such an annotation can be achieved automatically by means of a corresponding algorithm.

The neural network of the object detection apparatus 100 can thus be trained to recognize the additional attributes $1a \ldots 1n$ of the detected objects. For this purpose, the neural network can be provided with additional neurons, in particular output neurons, by means of which a process of recognizing the additional attributes is made possible.

In accordance with one embodiment, distance of objects from the object detection apparatus can be determined by means of a stereo matching algorithm, wherein a stereo matching algorithm here is an algorithm known from the prior art for determining the depth of objects in image recordings.

$2^{nd}$ Variant: Determining the Attributes $1a \ldots 1n$ by Means of a Further Algorithm In this variant, indicated in FIG. 4, the attributes $1a \ldots 1n$ are determined by way of a fusion of the object detections with a further algorithm 101. By way of example, a traditional object detection apparatus 100 shall be provided, which, in response to input data D, yields attributes in the form of bounding elements for objects and also the assigned object class. A fusion algorithm 102 enriches the raw detections with further attributes $1a \ldots 1n$, wherein said further attributes $1a \ldots 1n$ are determined from additional information I, calculated from the input data D and/or the further information I by way of one or more further algorithms. The downstream suppression device 110 filters the raw detections attributed in this way by discarding those raw detections for which there is another raw detection with a higher confidence value in their vicinity.

Figure 4:
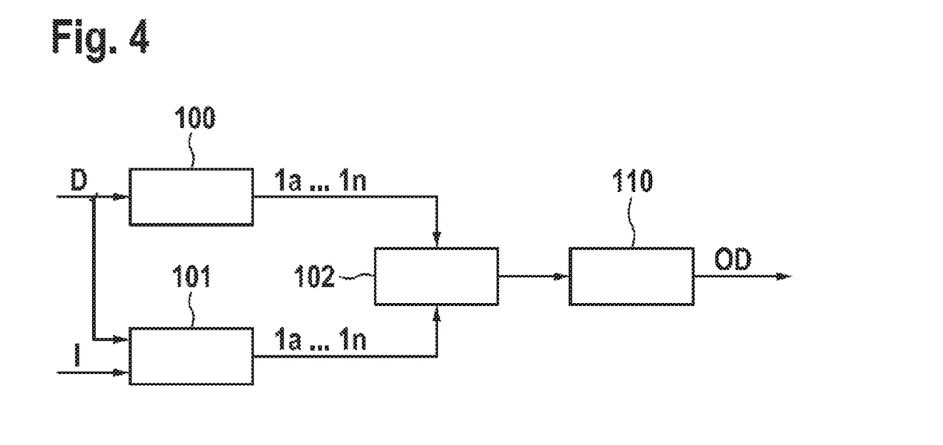
FIG. 4 shows a basic alternative sequence of the proposed method.

The further algorithm 101 (e.g. stereo algorithm or Structure from Motion) can be used for example to calculate to calculate an attribute (e.g. distance from the camera, so-called depth) in an image region (e.g. per pixel of the input data D). These depth values are then fused with the object detections for example by forming the mean or median of the corresponding depth values within each bounding element of each object. The depth thus calculated per bounding element can be used as attribution for the respective object. It is also conceivable, of course, that other values not explained in more specific detail here can be calculated by means of the algorithm.

Some possible manifestations of the proposed method are elucidated by way of example below:

the raw detections are present with attributes $1a \ldots 1b$ in the form of bounding elements and are provided with a further attribute $1a \ldots 1n$ in the form of a scaler depth estimation (distance from the camera). Two attributes $1a \ldots 1n$ in the form of the bounding elements are considered to be similar if their Intersection-over-Union exceeds a first threshold value t1 and an absolute difference between the estimated additional attributes 1a . . . 1n in the form of the depths falls below a threshold value t2.

Besides estimating the attribute 1a . . . 1n in the form of the bounding element for each raw detection, the object detection apparatus 100 additionally estimates a further attribute 1a . . . 1n in the form of a direction of movement of the object, which is represented as a vector. In this case, two attributes 1a . . . 1n in the form of the bounding elements are considered to be similar if their Intersection-over-Union exceeds a first threshold value t1 and an angle between the two vectors is less than a second threshold value t2.

The object detection apparatus 100 need not necessarily predict the position of an object in the form of a person in the form of a bounding element, but rather can also carry this out by means of bounding points describing the positions of individual body parts. A possible distance measure of raw detections for this case is the sum of the Euclidean distances of the positions of the estimated body parts.

Figure 5:
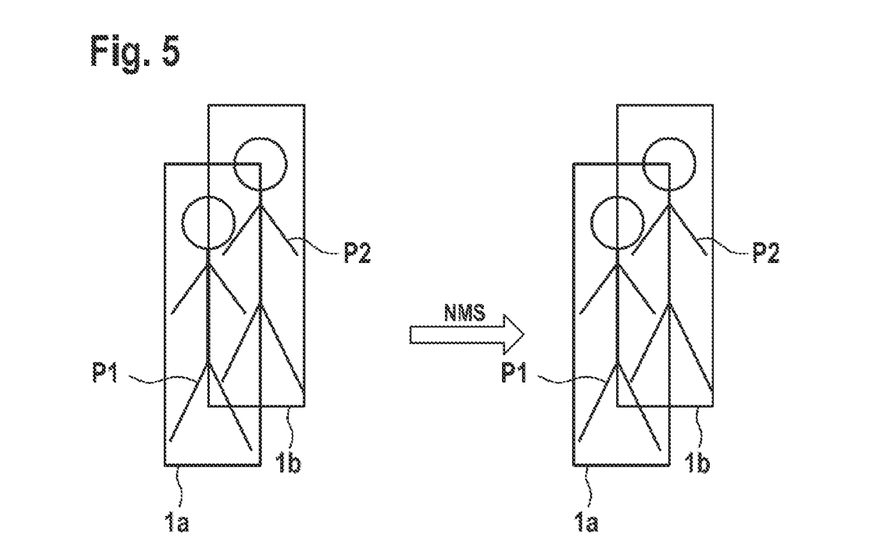
FIGS. 5, 6 show basic illustrations of a proposed NMS method.
Figure 6:
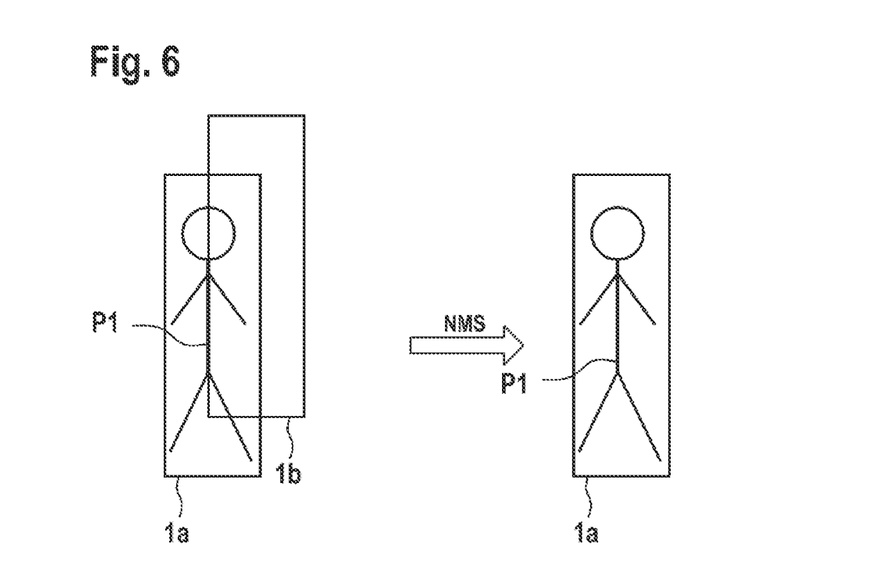

FIGS. 5 and 6 show an exemplary advantageous application of the proposed method:

Two objects in the form of persons P1, P2 are predicted in the scenario of FIG. 5, and only one object in the form of the person P1 is predicted in the case of FIG. 6. In both cases, the object detection apparatus 100 yields two raw detections with attributes 1a, 1b in the form of bounding elements. If the non-maximum suppression is based exclusively on the Intersection-over-Union (IoU), as is conventionally the case, with an identical IoU threshold value it is not possible to correctly resolve the scenarios of FIG. 5 and FIG. 6.

Taking account of additionally predicted attributes 1a . . . 1n using a distance function, such as e.g. the estimated distance of the object from the camera, makes it possible to correctly resolve both scenarios. Here both persons P1, P2 with the assigned attributes 1a, 1b in the form of the respectively assigned bounding elements are recognized in the case of FIG. 5, whereas only the person P1 with the assigned attribute 1a in the form of the bounding element is recognized in the case of FIG. 6.

This can be described as follows in mathematical form:

From two raw detections with assigned attributes 1a, 1b, a distance d(1a, 1b) between the objects is calculated. It should be taken into consideration that here the scalar detection quality already present is likewise regarded as an attribute 1a . . . 1n. Analogously to the overlap in the case of traditional non-maximum suppression, a threshold value t is defined, and when a value falls below it two raw detections are deemed to be "similar" and thus grouped. A distance measure for grouping raw detections thus ought to be as small as possible, such that the following holds true:

$$d(1a,1b)<t$$

Within the groups of raw detections, a procedure as previously can be adopted for suppressing bounding elements, or else for including the given attributes 1a . . . 1n in the raw detection. In this regard, for example, instead of the detection quality, the transferred attributes could also be used for suppression, in order e.g. in particular always to obtain the detections in closest sensor proximity.

It is proposed that a plurality of distance measures on different attributes can be logically or arithmetically combined to form one measure.

Some possible manifestations of the proposed method are presented by way of example below:

the raw detection data are provided with scaler depth determination data (i.e. distance of the object from the sensor, e.g. from the camera). The depth determination required for this purpose can be effected by means of a determination of the object detector or by means of a combination of the raw detection data with a depth map calculated by means of a stereo matching algorithm. Two bounding elements are considered to be similar if their Intersection-over-Union exceeds a threshold value t1 and an absolute difference between the estimated depths falls below a threshold value t2.

Besides determining the bounding element for each raw detection, the object detection apparatus 100 additionally determines a direction of movement of an object in the form of a vector. Two bounding elements are considered to be similar if their Intersection-over-Union exceeds a first threshold value t1 and an angle between the vectors mentioned is less than a second threshold value t2.

The object detection apparatus 100 does not determine the position of the object in the form of a bounding element, but instead regresses the position of specific body parts, for instance the position of the head, of the left/right arm/leg, etc. A possible distance measure for this case is the sum of the Euclidean distances of the positions of the estimated body parts.

FIG. 5 shows a basic sequence of one embodiment of the proposed method. A bounding element determined for the object to be recognized is evident, an attribute in the form of a confidence value of 0.9 and an additional attribute in the form of a distance of 5 m being assigned to said bounding element. Furthermore, a bounding element 1b is evident, an attribute in the form of a confidence value of 0.8 and an additional attribute in the form of a distance of 10 m being assigned to said bounding element. By determining a distance measure of the additional attributes of the bounding elements 1a and 1b in the form of a difference between the distances, a differentiation of the two raw detections defined by the bounding elements can be achieved. The two raw detections are thus recognized as different if a determined difference of the distance, that is to say the distance measure of the additional attributes, is greater than a predetermined limit value. If a predetermined limit value in the example shown is fixed at 2 m, for example, then a difference of the two raw detections is determined since a difference between the distances of the determined bounding elements 1a, 1b is greater than the threshold value of 2 m chosen by way of example with regard to the chosen distance function "absolute difference in the depths", as a result of which the objects are not grouped and are recognized as different. By contrast, if the limit value or threshold value were fixed at 6 m, for example, the two raw detections shown in FIG. 5 would be recognized as identical and grouped in a corresponding grouping. The information regarding the difference or identicalness of the detected raw detections can be taken into account in subsequent non-maximum suppression in order thus to be able to select the most exact raw detection for object determination.

Without the further attribute 1a . . . 1n, exclusively the bounding element 1a with the person P1 would be output by the object detection apparatus 100 after application of non-maximum suppression, and the bounding element 1b would thus be conventionally suppressed. With the aid of the additionally determined attribute 1a . . . 1n in the form of depth and an assigned threshold value of, for example, 2 m relating to the bounding elements of the attributes 1a, 1b, the two bounding elements of the attributes 1a, 1b are not grouped, rather both bounding elements of the attributes 1a, 1b are output.

What is thereby carried out as a result, as illustrated in the right-hand section of FIG. 5, is an object detection of a person P1 with the attribute 1a in the form of a bounding element and an object detection of a person P2 with the attribute 1b in the form of a bounding element.

FIG. 6 shows an alternative scenario with the application of the proposed method. There is evident once again a raw detection with an attribute 1a in the form of a bounding element, an attribute in the form of a confidence value of 0.9 and an additional attribute in the form of a distance of 5 m is assigned. Furthermore, there is evident a further raw detection with an attribute 1b in the form of a bounding element, an attribute in the form of a confidence value of 0.8 and an additional attribute in the form of a distance of 6 m.

In accordance with the example shown in FIG. 5 with a predetermined threshold value of 2 m, the raw detections shown in FIG. 6 are recognized as identical since the distance measure of the two additional attributes in the form of a difference between the two distances of the two raw detections from the object detection apparatus is less than the predetermined threshold value of 2 m.

As a result, as illustrated in the right-hand section of FIG. 5, an object detection of the first person P1 is thereby carried out by means of the first bounding element 1a because a difference between the predicted attributes "distance" falls below a defined measure, whereby the second bounding element 1b is suppressed. Since both bounding elements 1a, 1b are thus assigned to the person P1, the attribute in the form of the depth attribute is very similar and below the defined threshold.

As a result, the two bounding elements 1a, 1b are thereby grouped and only the bounding element 1a is output, which corresponds to the behavior of conventional methods.

In the two scenarios of FIG. 5 and FIG. 6, the object detection apparatus 100 thus yields two raw detections with identical bounding elements 1a, 1b and identical IoU values of the attributes 1a, 1b in the form of bounding elements. However, if the non-maximum suppression is based only on the Intersection-over-Union (IoU), with an identical IoU threshold value it is not possible to correctly resolve the scenarios of FIG. 5 and FIG. 6. Taking account of additionally predicted attributes (in this case the determined distance of the object from the camera) advantageously makes it possible to correctly resolve both scenarios.

Two raw detections are thus regarded as similar both if their overlap measure exceeds a first threshold value t1 and if an absolute difference between the estimated depths falls below a second threshold value t2, whereby one of the raw detections is suppressed by means of the non-maximum suppression as a result.

Figure 7:
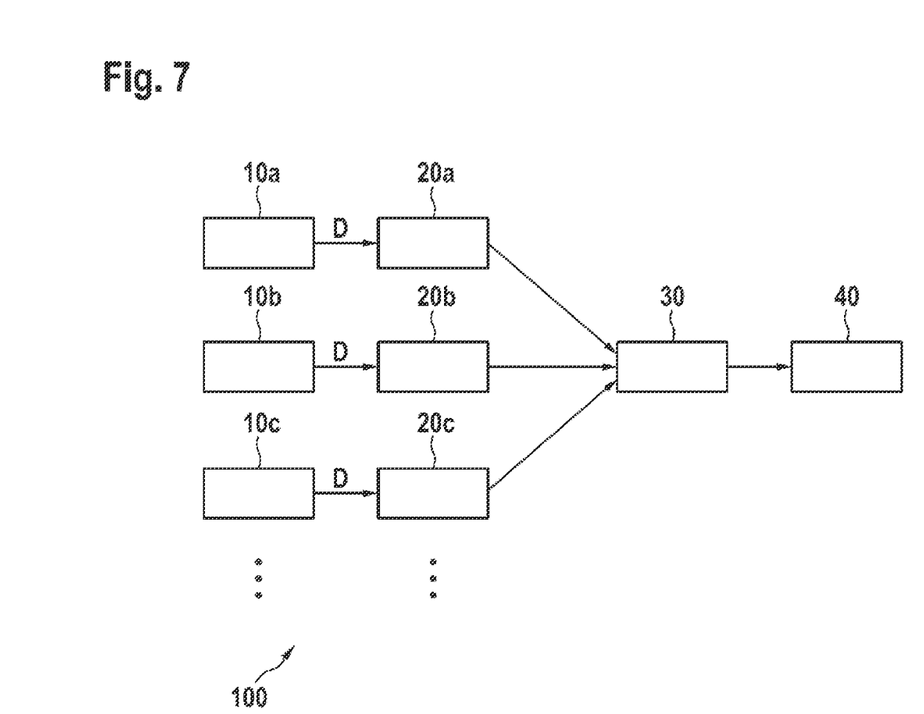
FIG. 7 shows a basic illustration of a proposed object detection apparatus.

One embodiment of a proposed object detection apparatus 100 is illustrated schematically in FIG. 7. A plurality of sensor devices 10a . . . 10n (e.g. lidar, radar, ultrasonic sensor, camera, etc.) are evident, which for example are installed in a vehicle and are used to provide input data D. The attributes 1a . . . 1n mentioned can be determined in each case by a single sensor device 10a . . . 10n or else by a plurality of sensor devices 10a . . . 10n, wherein in the latter case the sensor devices 10a . . . 10n should be calibrated with respect to one another.

Connected downstream of each of the sensor devices 10a . . . 10n there is evident a respectively assigned processing device 20a . . . 20n comprising a trained neural network (e.g. region proposal network, convolutional neural network), which processes the input data D provided by the sensor devices 10a . . . 10n by means of the proposed method and feeds them to a fusion device 30. By means of the fusion device 30, the object recognition is carried out from the individual results of the processing devices 20a . . . 20n.

An actuator device 40 of the vehicle is connected to an output of the fusion device 30 and is driven depending on the result of the object recognition carried out, for example in order to initiate an overtaking process, a braking process, a steering maneuver of the vehicle, etc.

A training scenario of a proposed processing device 20a . . . 20n is not illustrated in figures. In this case, annotated training data consisting of input data D and assigned annotations are used, wherein the annotations comprise defined assignments of objects within the input data D, e.g. coordinates of persons in the input data. The annotations to the input data D can be carried out in a manner known per se by means of human activity or else in automated fashion. The training process can be carried out in accordance with supervised training processes known from the prior art. Preferably, a convolutional neural network with an arbitrary number of convolutional kernels can be used for the object recognition. Alternatively, an arbitrary plurality of convolutional neural networks can be used.

The neural network or the plurality of neural networks is trained in the training process to recognize the annotated attributes and additional attributes besides recognizing the object. For this purpose, in the training process, it is possible to identify or annotate corresponding attributes on objects imaged in image recordings of the training data, such that the neural network can be trained to recognize the identified attributes.

The processing device 20a . . . 20n of the object detection apparatus 100 thus comprises a neural network after a completed training phase. It is also conceivable for the neural network also to be trained further online. The trained neural network is used in the processing devices 20a . . . 20n, learning on the part of the neural network not being provided any more at the time of operation of the object detection apparatus 100.

Although the disclosure has been described above exclusively on the basis of two-dimensional image data, it goes without saying that the disclosure can also be implemented with input data D of arbitrary dimensionality, such as, for example, lidar data, radar data, etc., wherein input data D of varying dimensionality are also conceivable. In this case, the attributes 1a . . . 1n in the form of the bounding elements 1a . . . 1n are embodied in three-dimensional fashion.

Figure 8:
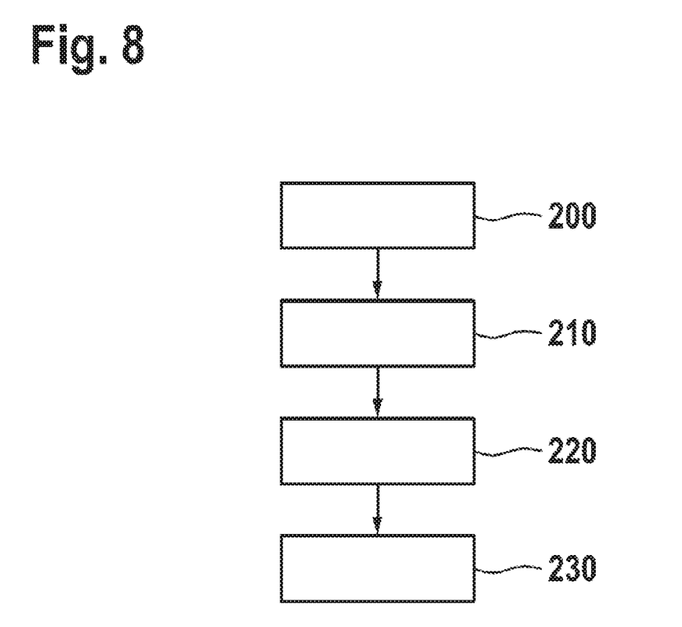
FIG. 8 shows a basic illustration of one embodiment of the proposed method.

FIG. 8 shows a basic flow diagram of one embodiment of the proposed method.

A step 200 involves carrying out raw detections, wherein at least one attribute 1a . . . 1n in the form of a detection quality is determined for each raw detection.

A step 210 involves determining at least one further attribute 1a . . . 1n for each raw detection.

A step 220 involves determining a temporally or spatially resolved distance measure for at least one attribute 1a . . . 1n of the raw detections, wherein raw detections of a defined distance measure are combined to form a group of raw detections.

A step 230 involves determining the object to be recognized from a group with at least one raw detection with the smallest distance measure of the at least one attribute 1a . . . 1n in comparison with another raw detection or determining the object to be recognized from a group with at least one raw detection which were combined by combining at least two raw detections with the smallest distance measure of the at least one attribute 1a . . . 1n to form said one raw detection.

The proposed method is preferably embodied as a computer program having program code means for carrying out the method on the processing device 20a . . . 20n.

It is also conceivable to implement the proposed method by means of an electronic hardware circuit ideally, at least in part.

The disclosure can advantageously be applied to all products in which an object detection is carried out, such as, for example:
- intelligent cameras for at least (partly) automated vehicles. In this case, the detection enables the recognition of obstacles or a more general interpretation of scenery and/or a resultant active intervention in a driving situation, e.g. by means of actuators
- robots that evade obstacles on the basis of camera data (e.g. autonomous lawnmowers)
- monitoring cameras that can be used to estimate e.g. a number of persons in a specific local region
- intelligent sensors in general that carry out an object detection on the basis of radar or lidar data, for example, that uses attributes determined by a camera, for example, in a further manifestation.

Although the disclosure has been described above on the basis of concrete exemplary embodiments, the person skilled in the art can also realize embodiments not disclosed or only partly disclosed above, without departing from the essence of the disclosure.

What is claimed is:

1. A method for recognizing an object from input data, the method comprising:
   carrying out raw detections from the input data;
   determining at least one first attribute for each raw detection, the at least one first attribute including a detection quality;
   determining at least one second attribute for each raw detection;
   determining a distance measure for at least one of the at least one first attribute and the at least one second attribute for each of the raw detections, the determined distance measure being temporally resolved or spatially resolved;
   combining the raw detections into groups of raw detections based on a comparison of the determined distance measures to at least one defined distance measure;
   identifying a selected group of the groups of raw detections as (i) a group of raw detections with a smallest distance measure in comparison with the distance measure of at least one other group of raw detections, or (ii) a group of raw detections having one raw detection formed by combining at least two of the raw detections, the combined raw detections having a smallest distance measure; and
   determining the object to be recognized from the selected group of raw detections.

2. The method according to claim 1, the determining the distance measure further comprising:
   determining the distance measure for at least one of the following attributes: (i) direction of movement of the object, (ii) an orientation of the object, (iii) a distance of the object from a sensor device, (iv) an interaction of the object with at least one other object, and (v) a Euclidean distance of parts of the object.

3. The method according to claim 1, the determining the object to be recognized comprising:
   using a first threshold value of a first distance measure and a second threshold value of a second distance measure to suppress one of the raw detections of the selected group of raw detections.

4. The method according to claim 2 further comprising:
   using, as input data of a second sensor device, the at least one second attribute that is determined for input data of a first sensor device.

5. The method according to claim 1, wherein the at least one first attribute includes a bounding element of an object for determining the object from the raw detections.

6. The method according to claim 1, wherein the at least one first attribute includes principal points of an object for determining the object from the raw detections.

7. The method according to claim 1, wherein the at least one first attribute and the at least one second attribute are determined by at least one of an object detection apparatus and an algorithm.

8. The method according to claim 1, wherein the input data are provided by one of (i) one sensor device, (ii) a plurality of sensor devices, and (iii) a storage medium.

9. The method according to claim 1, wherein the input data include at least one of (i) camera data, (ii) radar data, (iii) lidar data, and (iv) ultrasonic data.

10. The method according to claim 1 further comprising:
    generating a control signal for a physical system based on the determined object to be recognized.

11. A method for controlling an autonomously driving vehicle taking account of environment sensor data, the method comprising:
    capturing environment sensor data using at least one environment sensor of the autonomously driving vehicle;
    recognizing an object based on the captured environment sensor data, the object being recognized by:
      carrying out raw detections from the captured environment sensor data,
      determining at least one first attribute for each raw detection, the at least one first attribute including a detection quality,
      determining at least one second attribute for each raw detection,
      determining a distance measure for at least one of the at least one first attribute and the at least one second attribute for each of the raw detections, the determined distance measure being temporally resolved or spatially resolved,
      combining the raw detections into groups of raw detections based on a comparison of the determined distance measures to at least one defined distance measure,
      identifying a selected group of the groups of raw detections as a group of raw detections with a smallest distance measure in comparison with the distance measure of at least one other group of raw detections, or a group of raw detections having one raw detection formed by combining at least two of the raw detections, the combined raw detections having a smallest distance measure, and
      determining the object to be recognized from the selected group of raw detections;
    determining, taking account of the recognized object, a surroundings state of the autonomously driving vehicle using a control module of the autonomously driving vehicle, the surroundings state describing at least one traffic situation of the autonomously driving vehicle including the recognized object;

generating, using the control module, a maneuvering decision based on the surroundings state; and effecting, using control systems of the autonomously driving vehicle, a control maneuver based on the maneuvering decision.

12. The method according to claim 11, wherein the control maneuver is at least one of an evasive maneuver and an overtaking maneuver which is configured to steer the autonomously driving vehicle past the determined object to be recognized.

13. An object detection apparatus for recognizing an object from input data, the object detection apparatus configured to:

carry out raw detections from the input data;

determine at least one first attribute for each raw detection, the at least one first attribute including a detection quality;

determine at least one second attribute for each raw detection;

determine a distance measure for at least one of the at least one first attribute and the at least one second attribute for each of the raw detections, the determined distance measure being temporally resolved or spatially resolved;

combining the raw detections into groups of raw detections based on a comparison of the determined distance measures to at least one defined distance measure;

identifying a selected group of the groups of raw detections as (i) a group of raw detections with a smallest distance measure in comparison with the distance measure of at least one other group of raw detections, or (ii) a group of raw detections having one raw detection formed by combining at least two of the raw detections, the combined raw detections having a smallest distance measure.

14. The object detection apparatus according to claim 13 further comprising:

a processing device having a neural network, the processing device being configured to at least partly perform at least one of the carrying out the raw detections, the determining the at least one second attribute, the determining the distance measure, and the determining the object to be recognized.

15. The method according to claim 1, wherein the method is carried out by executing, with a computer, instructions of a computer program stored on a non-transitory computer-readable storage medium.

16. The method according to claim 10, wherein the physical system is a vehicle.

* * * * *